United States Patent [19]

Ruscelli et al.

[11] Patent Number: 4,709,739
[45] Date of Patent: Dec. 1, 1987

[54] UNIVERSAL TUBULAR-TIRE FOR BICYCLES

[75] Inventors: Emilio Ruscelli; Cesare Carrera, both of Milan; Giuseppe Formenti, Motta Visconti, all of Italy

[73] Assignee: Pneumatici Clement S.p.A., Italy

[21] Appl. No.: 798,338

[22] Filed: Nov. 15, 1985

[30] Foreign Application Priority Data

Nov. 23, 1984 [IT] Italy .............................. 23730 A/84

[51] Int. Cl.$^4$ ............................ B60C 5/00; B60C 3/02
[52] U.S. Cl. ..................................... 152/453; 152/454; 152/379.3; 152/513
[58] Field of Search ............ 152/453, 454, 450, 379.3, 152/380, 513

[56] References Cited

U.S. PATENT DOCUMENTS

| | | | |
|---|---|---|---|
| 2,190,905 | 2/1940 | Welch | 152/453 |
| 3,318,357 | 5/1967 | Schwall, Jr. | 152/453 |
| 3,613,762 | 10/1971 | Reinhart, Jr. | 152/453 |
| 3,895,668 | 7/1975 | Tangorra | 152/379.3 |
| 4,585,044 | 4/1986 | Carrera et al. | 152/453 |

FOREIGN PATENT DOCUMENTS

484115 10/1927 Fed. Rep. of Germany ... 152/379.3

Primary Examiner—Michael Ball
Attorney, Agent, or Firm—Stevens, Davis, Miller & Mosher

[57] ABSTRACT

The invention concerns a tubular-tire for bicycles and its assembly on a mounting-rim of the channel type—that is normally used in combination with the usual tires having a beaded edge.

The tubular-tire of the invention has a tunnel-shaped carcass profile, in the plane of the cross-section, provided with a supporting-base which is substantially concave in the center and flat at the sides and with also having two sidewalls that join together in a substantially semicircular vault.

The radially inner portion of the sidewalls is joined, at the supporting base, at an angle of less than 90° and it is reinforced with a pair of reinforcing elements—one textile and the other either a textile fabric, or an elastomeric liner.

The radially innermost portion of the tubular-tire can be inserted into the channel of a flanged-rim—with thus constituting with said rim, after tire inflation, a stable and inseparable assembly—that proves to be both suitable and efficacious—and with also guaranteeing a qualitatively high road-behavior for the tire.

9 Claims, 4 Drawing Figures

UNIVERSAL TUBULAR-TIRE FOR BICYCLES

BACKGROUND OF THE INVENTION

The present invention relates to the tubular-tires for bicycles—i.e. those tires whose beadless carcass is completely closed in a toroidal-ring form and which are fitted onto an opportune mounting rim that is devoid of the usual bead-blocking flanges—that instead, are intended for those rims for mounting tires having beaded edges, an example of such a tubular tire is Assignee's prior U.S. Pat. No. 4,585,044. In particular, the present invention concerns a tubular-tire that can be fitted onto any whatsoever type of rim. It is known that—depending upon the kind of usage, there are substantially two diverse types of tire rims used. The first of these types intended for touring, is a rim that—apart from its size, is very similar to a rim for car-tires, provided with a radially outer profile that presents two supporting bead-bases, an intermediate substantially concave portion and two flanges terminating in a curbing-ridge axially protruding inwardly of the rim—for allowing the blocking of the tire beads. The second type of rim, intended for sports use—and, in particular, competitive sports events, presents a radially outer profile which is substantially concave with flattened or convex lateral portions, devoid of flanges and ridges and which is apt for constituting the supporting-base for the radially inner surface of the tubular-tire. This differentiation in the tire—and consequently of the rims, finds its explanation in the fact that, for competitive sports events, tubular 'beadless' tires are to be preferred—due to their lightweightedness, their minimum hysteretical absorption, their extreme flexibility and the speedy substitution of the tire in case of a puncture—so much so, that they cannot be compared to the usual beaded tires. These assets however, are counteracted through their having certain drawbacks which can only be acceptable when a high specialization of these tires is expected—in relation to what uses they are destined for. In particular, since they are devoid of beads, these tubular-tires require to have a rim that must—as nearly as possible, have the profile of the tubular-tire. Moreover, for preventing circumferential rib-slipping and axial shiftings with respect to rim of the tubular-tire, during tire exercise the supporting surface of the tubular-tire on the rim, has to be suitably prepared and treated with a special adhesive—and such a preparation is both complex and costly, with also requiring long waiting periods for the adhesive to dry. Nevertheless, even these adhesives lose their effectiveness—as far regards the sticking of the tubular-tire on the rim, whenever the latter is overheated owing to the braking action. All these drawbacks result as being unacceptable when utilizing the bicycles normally used—let us say for touring in general, so much so that, in this sector, what is widely preferred is a beaded tire which does not present any great problems for anchoring the tire onto the rim, nor for substituting an air-tube in case of punctures—and even though it is incapable of achieving the brilliant performances had with tubular-tyres. From what has been stated, it appears quite clear that the characteristics of tire usage for cycles, require two, very different tire structures—and that these structures, owing to their constructive characteristics, require two diverse types of rims, seeing that it is impossible to interchange the two tires. In fact, it is verifiable that to-date, no tubular-tire has yet been produced, which can be fitted over the normal channel-type rims. A contrary situtation is evidently not even worth considering. However, what is quite clear is the interest that can be found amongst users with said solution i.e. a tubular-tire, endowed with sports performances and characteristics—that can be mounted onto the flanged-rims with, in this way, also eliminating all the drawbacks involved with the need for treating these 'non-flanged' rims with adhesives.

So much so that diverse efforts in this direction were made—and they generally ended in vulcanizing, in the radially inner position, on a normal tubular-tire, a false-bead that allowed for blocking the tubular-tire upon the flanged-rim.

However, this solution did not solved the problem in any opportune way, also because the result has always produced an undesired increase in weight for this tubular-tire—which fact modifies its qualitative level.

In the tubular-tires field, the Applicant has recently also invented a new type of tire—having a tunnel-shaped cross-section, previously mentioned U.S. Pat. No. 4,585,044, which has shown to be capable of bringing about further considerable improvements in the qualitative characteristics of the normal tubular-tires that have a circular cross-section, so much so that this tubular-tire has rapidly come to the attention of technicians skilled in the art and also of sportsmen.

SUMMARY OF THE INVENTION

The Applicant has now discovered surprisingly that, provided that said new tubular-tire is built with an adequate carcass structure, it can efficaciously even solve the problem of interchangeability on the rims—or, more precisely, it can be readily mounted either on the flanged-rims or else, on flangeless-rims.

Therefore, what forms the object of this invention is a tubular-tire for bicycles, that is provided with a carcass comprised by at least one rubberized-fabric strip comprising reinforcing cords, the extremities of said strip being jointed so as to form a ring, with presenting its lateral edges joined together longitudinally to form a closed tubular carcass, of a substantially constant thickness, that presents a tunnel-shaped section comprising a substantially concave supporting-base and two sidewalls terminating in a substantially semicircular vault—with the section-ratio comprised between 1 and 1.7, the inner angle of the corner—formed by the coupling between said base and sidewalls, being less than 90°, characterized by the fact that in correspondence of said base and joined to it, said carcass comprises a first reinforcing element—in correspondence at least of said coupling-corners, extending radially outwardly along the sidewall of the tubular-tire for a height of not less than 15% of the section height of said carcass, and a second reinforcing element made of a rubberized-fabric—extending axially from one sidewall to the other of the tubular-tire, reinforced with cords disposed in the circumferential direction with respect to the tire.

According to a preferred embodiment of the invention, the above-said first reinforcing element extends radially outwardly up to a height of not greater than 70% of the section height of the tire. Moreover, the said first reinforcing element can be extended in the axial direction, along said supporting-base, from one sidewall to the other of the tubular-tire.

In a first embodiment, the said first reinforcing element is comprised by an elastomeric liner having a Shore-A hardness of not less that 60, and a consumption—in the DIN Test No. 53516, of not greater than 100 mm$^3$; whereas, in another, equally opportune, alternative version, the said first reinforcing element is a woven rubberized-fabric, reinforced with synthetic fibre yarns—that are however, disposed in any way with respect to the circumferential direction of the tire.

A combination of both these solutions is also possible—meaning that the above-said first reinforcing element is a woven fabric, rubberized with an elastomeric material having a Shore-A hardness of not less than 60 and a consumption, in the DIN Test No. 53516, of not less that 100 mm$^3$.

Instead, the second reinforcing element is a rubberized fabric that by choice may be either a woven fabric or a cord-fabric, with having its cords disposed circumferentially. In particular, the above-said fabric is preferably woven and made with natural-fibre cords—with the warp-cords being disposed circumferentially.

Furthermore, what constitutes a second object of the present invention is a bicycle wheel, characterized by the fact of comprising a rim for supporting the tire, provided in the radially outward position with a channel for housing the tire, comprising two cylindrical axially lateral surface portions for holding the beads, an intermediate, substantially concave portion and two bead-sustaining flanks that extend radially outwardly—substantially in the perpendicular direction of said supporting surface, terminating with a curbing-ridge that protrudes axially inwardly, and a tubular-tire, devoid of beads, of a substantially constant thickness, fitted onto said rim, with its radially innermost portion contained in the said tire-housing channel. In a particular, convenient embodiment said wheel for bicycles, comprises a tubular-tire having a tunnel-shaped profile that presents a supporting-base and two sidewalls which terminate in a semicircular vault, with the section ratio comprised between 1 and 1.7, the angle inside the joint, between said base and said sidewalls, being less than 90°.

BRIEF DESCRIPTION OF THE DRAWINGS

In any case, the present invention will be better understood with the aid of the following description and the attached FIGURES, given solely by way of non-limiting example, where.

Figure 1:
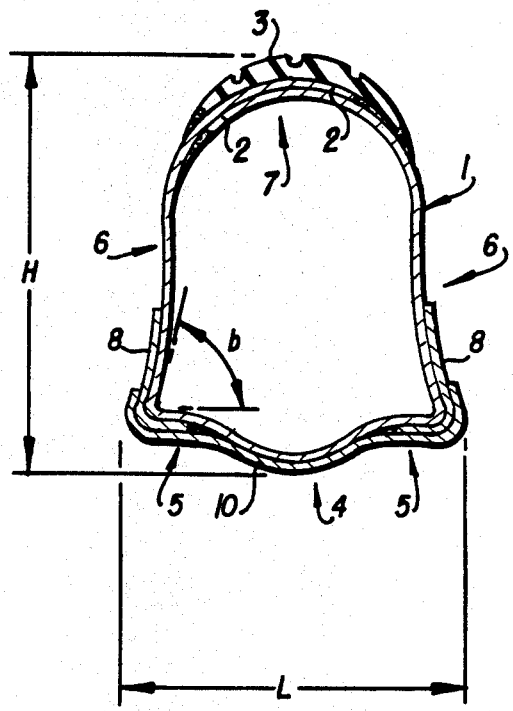
FIG. 1: shows a cross-section of the tubular-tire, according to the invention, as it is vulcanized inside a mould.

Hence, in FIG. 1—the cross-section is shown of the tire according to the invention, just as it is seen after being extracted from the vulcanizing mould.

The above-said tubular-tire consists of a carcass comprising a strip 1 of a woven rubberized fabric, reinforced with synthetic fibre cords, joined by their extremities for so forming a ring, and with their lateral edges 2 joined longitudinally by overlapping—in such a way as to form the shown tubular-tire. The method for producing a tubular-tire is by now well-known to all, so much so that there is no special need to expiate on particulars and great details; it will be sufficient to bear in mind that—apart from being woven, the carcass fabric can also be made of a cord-fabric (in which instance, two overlapped strips will be had, with the cords being parallel in each strip and crossed with those of the adjacent strip), with the reinforcing cords being made of any whatsoever appropriate material—either natural or artificial. The joint between the edges, can either be effectuated by overlapping, or else by butt-end joining—and it is unnecessary for it to be in a radially outer position (like that of FIG. 1.)

It is useful to remember that, in the finished tubular-tire, there is also an air-tube (not shown for clarity of the drawing), that is inserted into the carcass prior to the joining of the edges—or, as an alternative, the tubular-tire has its inner surface entirely covered with an elastomeric air-proof liner.

In the position that is radially outside said carcass (and, in the given case, also for the purpose of protecting the joint of the edges 2), there is disposed an elastomeric band 3—that goes to form the tire tread-band.

The particular profile must be noted of the cross-section in the tubular tire, that comprises a supporting-base with a central tract 4, that must be substantially concave, and two axially flat lateral portions 5 that assume, as far as possible, the profile of the flangeless-rim (see FIG. 4) and two sidewalls 6 that terminate in a semicircular vault 7—with thus forming a profile that is usually known as a tunnel-shaped profile.

The inner coupling angle "b", between the sidewalls and the supporting-base, is less than 90°—but preferably over 75°.

Unlike the circular-section having a substantially constant width—in any whatsoever direction, the tunnel-shaped section can be characterized and identified by a height H and a width L—as diverse to each other.

In the tubular-tire of the invention, we define as 'section-height H' the maximum radial height of the tubular-tire, on its being extracted from the mould.

Again, we define as 'section-width L' the maximum width of the tubular tire under the same above-said conditions.

In the tubular-tire of the invention, the value of the ratio H/L is opportunely comprised between 1 and 1.7. The carcass-structure described above is completed, according to the invention, with a combination of further reinforcing elements disposed on the supporting-base and turned-up on the sidewalls around the said coupling-corners.

The first of said elements consists of a pair of reinforcing bands 8, each one turned-up, from either side, around the above-said corner and respectively settled upon the sidewalls of the tubular-tire and on the flat portion 5 of the supporting-base. The edges of the said bands, that are developed radially outwardly along the sidewalls of the tubular-tire, should not have a height of less than 15% of the section-height H—and preferably they should have a height comprised between 15% and 70% of said height.

In a first embodiment these bands can suitable be comprised by an elastomeric liner having a high Shore-A hardness—of not less than 60, and a consumption, in the DIN Test No. 5316, of not over 100 mm$^3$.

This test is already well-known to those skilled in the art and so it is quite unnecessary to give any detailed description of it here. It will be sufficient to bear in mind that it consists of pressing a cylindrical test-sample of the material under examination, against a rotating cylinder that is covered with an abrasive paper. The test-sample is pressed with a force of one kilogram and simultaneously shifted alternatively, in both senses, along the axis of the rotating cylinder. The duration-time for the test is pre-established, and the test-sample is weighed—both, at the beginning, as well as at the end of the test. Through the difference existing between these two weight values, the volume is estimated of the material which suffered abrasion during the test.

In a second embodiment said bands could instead be made of rubberized-fabrics reinforced with synthetic-fibre cords—and preferably, fabrics woven with nylon cords which are disposed in any way with respect to the circumferential direction of the tire. It is also possible, of course, to utilize a combination of the two above-said elements—or, in other words, to have a woven fabric rubberized with compounds—such as the previously indicated one.

Figure 2:
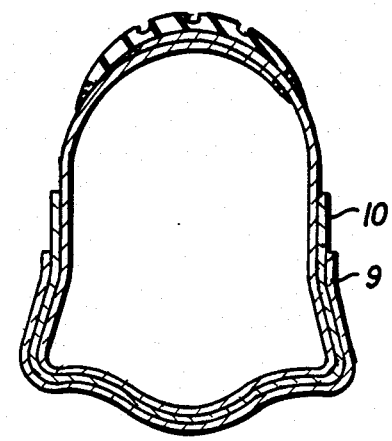
FIG. 2: shows the tubular-tire, according to the invention, on the same cross-section as in FIG. 1, in an alternative embodiment.

According to a diverse, but equally effective, embodiment, instead of having two distinct bands, it is possible to use a single element 9 (as shown in FIG. 2) either a fabric strip, or a liner made of a compound—as previously defined, that entirely covers the supporting base of the tubular tire—with extending from one sidewall to the other of the tire.

The second reinforcing element is comprised by a strip 10 of rubberized fabric—axially extending from corner to corner and turned-up around said corners. The reinforcing cords of the said strip, are preferably made of cotton. Moreover, the strip can either be made of a cord fabric, or else of a woven fabric—but it is preferable to have a woven fabric.

In any case, the cords of the cord-fabric, or a group of cords of the woven fabrics (the warp cords), must be disposed longitudinally—i.e. at 0° with respect to the circumferential direction of the tubular-tire. Although the solution preferred by the Applicant consists in disposing the said strip 10 outside the bands 8, and turned-up around the corners for a small tract (2-3 mm)—but less however, than the height of the flanges in the mounting-rim (as will be described further on), what are just as possible, are the variations consisting of disposing said strip 10 internally—with respect to the bands 8 or to the strip 9, and/or with the turn-ups extended radially outwardly till exceeding the radially outside edge of said bands 8, or of the equivalent reinforcing element 9.

At this point it can be noted that the carcass is a structure of a substantially uniform thickness—or, in other words, it has the profile of the inner cavity which, substantially speaking, does not shift away from the outer profile of the tubular-tire. The variations in thickness, are only those constituted by the overlappings of the diverse reinforcing structures which comprise the carcass.

In other words, the carcass does not present anything similar to the already-mentioned localized thicknesses, created with further amounts of elastomeric material and/or of further reinforcing elements—apart from those previously described, which are apt for constituting zones of interference with the flanges of the channel-type rim for allowing the mounting of the tire on said rims.

Figure 4:
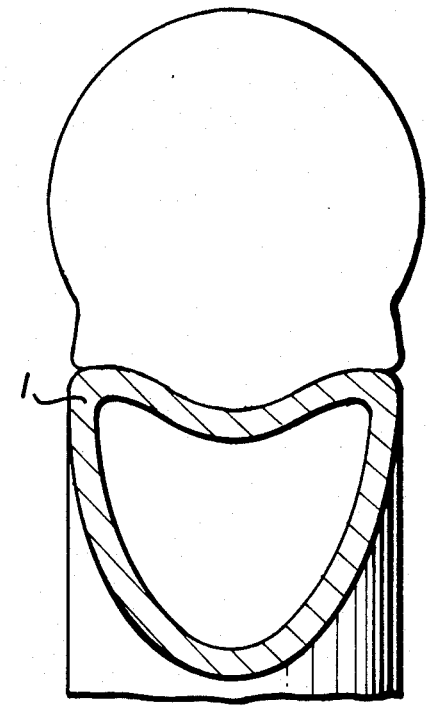
FIG. 4: shows the tubular-tire, according to the invention, mounted on the flangeless-rim, also inflated to normal inflation pressure.

Now FIG. 4 shows the tire of the invention mounted on the rim 11 of the type devoid of flanges—i.e. the rim that we shall define as the "racing" type. In this assembly, the tire of the invention has proved to have further improved the advantages already attained by the Applicant in the previous tunnel-shaped tubular-tire—in particular, with regard to the lateral and the circumferential stability of the tubular-tire on the rim.

Figure 3:
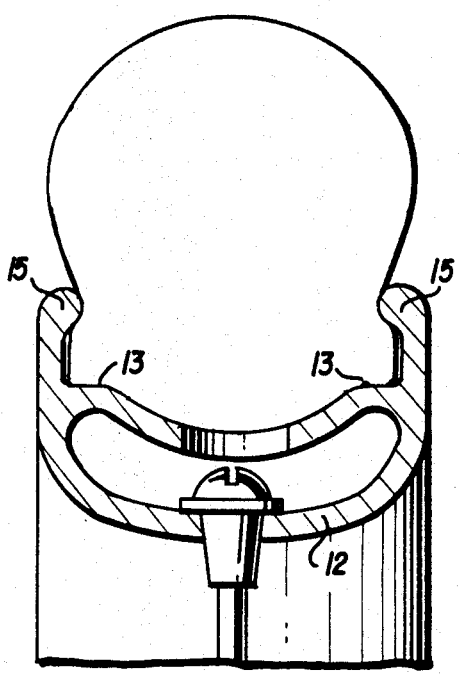
FIG. 3: shows the tubular-tire, according to the invention, mounted on the flanged-rim and inflated to normal inflation pressure.

Instead FIG. 3 shows the tire of the invention mounted on the well-known rim 12, provided with a bead-supporting surfaces 13 and flanges 14 and curbing-ridges 15 for holding the bead. This type of assembly has put an absolute novelty in the field of bicycle tires—that has finally allowed for realizing the 'universal' tire—i.e. a tire endowed with exceptional characteristics and performances, just like those required for sports' purposes—and which can nevertheless be used on normal touristic bicycles provided with normal flanged-rims. As can easily be guessed—from the above-given explanations and by the aid of the said FIG. 3, this tubular-tire can be easily mounted on the rim in its deflated state and without requiring any special implements, seeing that all beads—whether of the false type as previously stated, or of the structural type, are lacking—i.e. those stiffened carcass portions having annular inextensible circumferential elements, usually metallic, that are known as the bead-cores. The tubular-tire thus enters into the radially outer channel of said rim and becomes disposed, with the corners in the radially inner position with respect to the curbing ridge 15, disposed on the extremities of the flanges 14, developed radially outwardly, substantially in the perpendicular direction with respect to the supporting-surfaces 13 and axially protruding inwardly, in such a way as to precisely constitute the bead-holding devices. Then, on inflating the tubular-tire to normal inflation pressure, and thanks to the concavity of the profile at the supporting-base, said corners are forced axially outwardly and radially inwardly, towards the rim channel; while the carcass-portion, that is radially outside the rim, assumes a tendentiously circular profile. It can be noted that the coupling-angle value (less than 90°), between the base and the sidewall, favors the creating—in the tubular-tire's sidewall of a hinge-zone—which allows for modifying the profile of the tubular-tire section, in the above-said manner.

Moreover, the ample contacting-surface, between the tubular-tire and the rim, efficaciously prevents, through friction, any type of slipping in the circumferential direction, between the above-said elements. The stiffening structure of the corners (described above in detail) with which the tubular-tire of the invention is provided, also prevents any whatsoever deformation in this carcass zone—with hence, preventing any eventual dangerous rim-detaching of the tubular-tire during usage, with moreover preserving the sidewalls of the tubular-tire from wearing-out as a consequence of the repeated flexions of said sidewalls around the sustaining curbing-ridges. Vice-versa, said stiffening structure—owing to the fact that it results as being almost completely contained inside the rim-channel, does not in any manner influence the flexibility of the tubular-tire, with thus substantially maintaining unaltered the characteristics of softness and of immediate elastic-response—which were already peculiar to the Applicant's tubular-tire as a result of the specific tunnel-shaped profile itself.

Moreover, it must be understood that the present invention has only been given by way of non-limiting example and as such, it must not be considered as limited to the forms of embodiment described hereabove, but that it also extends to include within its scope all those modifications and alternative variations that can easily be deduced from the present invention idea by one skilled in the art.

What is claimed is:

1. In a beadless tubular bicycle tire, having a carcass with at least one rubberized-fabric strip comprising reinforcing cords, the extremities of said strip being jointed so as to form a ring, with its lateral edges jointed together longitudinally to form a closed tubular-carcass of a substantially constant thickness, that presents a tunnel-shaped cross-section comprising a substantially concave supporting-base and two sidewalls terminating in a substantially semicircular vault—with the section-ratio comprised between 1 and 1.7, the inner angle of the corner formed by the coupling between said base and said sidewalls being less than 90°, the improvement wherein corresponding to said base and joined to it, said carcass comprises for each of said coupling-corners a first reinforcing element, said reinforcing element extending on both sides of the corresponding coupling-corner axially on at least part of said supporting base and radially outwardly along the sidewalls of the tubular-tire, for a height of not less than 15% of the section height of said carcass, and a second reinforcing element made of a rubberized-fabric axially extending from one sidewall to the other sidewall of the tubular-tire and reinforced with cords disposed in the circumferential direction with respect to the tire.

2. A tubular-tire, according to claim 1, characterized by the fact that said first reinforcing element extends radially outwardly upto a height of not greater than 70% of the section-height of said tire.

3. A tubular tire, according to claim 1, characterized by the fact that said first reinforcing element extends in the axial direction, along the said supporting-base, from one sidewall to the other of said tubular tire.

4. A tubular tire, according to claim 1, characterized by the fact that said first reinforcing element is an elastomeric liner having a Shore-A hardness of not less that 60 and a consumption, in the DIN Test No. 5316, of not over 100 mm$^3$.

5. A tubular tire, according to claim 1, characterized by the fact that said first reinforcing element is a rubberized woven-fabric, reinforced with synthetic-fibre cords which are disposed in any way with respect to the circumferential direction of the tire.

6. A tubular tire, according to claim 5, characterized by the fact that said first reinforcing element is a woven-fabric, rubberized with elastomeric material having a Shore-A hardness of not less than 60 and a consumption in the DIN Test No. 5316, of not less than 100 mm$^3$.

7. A tubular-tire, according to claim 1, characterized by the fact that said second reinforcing element is a rubberized woven-fabric having the warp cords disposed circumferentially.

8. A tubular-tire, according to claim 7, characterized by the fact that said woven-fabric comprises natural-fibre cords.

9. The tubular tire of claim 1 in combination with a bicycle wheel for mounting said tire thereon, said wheel comprising a rim for supporting the tire, said rim having a generally "U" shaped channel defined by a pair of radially outwardly extending flanges on the axial outer edges of the channel, said flanges having, at their radial outer edges, axially inwardly turned ridges; said channel further having an axially extending bottom surface between the flanges; said tire fitting within the "U" shaped channel with its radially innermost portion adjacent the axial surface and said corners resting adjacent the radial inner portion of said flanges.

* * * * *